United States Patent
Meyer et al.

(10) Patent No.: US 7,203,167 B2
(45) Date of Patent: Apr. 10, 2007

(54) DATA FLOW CONTROL METHOD

(75) Inventors: Michael Meyer, Aachen (DE); Reiner Ludwig, Hürtgenwald (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 981 days.

(21) Appl. No.: 10/114,517

(22) Filed: Apr. 1, 2002

(65) Prior Publication Data

US 2002/0145976 A1 Oct. 10, 2002

(30) Foreign Application Priority Data

Apr. 4, 2001 (EP) .................................. 01107783

(51) Int. Cl.
*H04L 1/00* (2006.01)
(52) U.S. Cl. ...................................... 370/231; 714/748
(58) Field of Classification Search ................ 714/748; 370/229, 236, 231
See application file for complete search history.

(56) References Cited

U.S. PATENT DOCUMENTS

| | | | |
|---|---|---|---|
| 6,272,148 B1 * | 8/2001 | Takagi et al. ................ 370/469 |
| 6,483,805 B1 * | 11/2002 | Davies et al. ............... 370/235 |
| 6,882,624 B1 * | 4/2005 | Ma .......................... 370/236.1 |
| 6,958,997 B1 * | 10/2005 | Bolton ....................... 370/392 |
| 2002/0080721 A1 * | 6/2002 | Tobagi et al. ............... 370/239 |
| 2002/0097722 A1 * | 7/2002 | Liao et al. ................... 370/392 |
| 2002/0133596 A1 * | 9/2002 | Border et al. ............... 709/227 |
| 2005/0286523 A1 * | 12/2005 | Liao et al. ................... 370/389 |

OTHER PUBLICATIONS

Floyd, S. et al. "An Extension to the Selective Acknowledgement (SACK) Option for TCP", Internet Engineering Task Force, Jul. 2000, WWW.IETF.ORG, XP002173923 (pp. 1-17).
Wood, Lloyd et al. "Effects on TCP of Routing Strategies in Satellite Constellations", IEEE Communications Magazine, Mar. 2001, XP-002173922, (pp. 172-181).
Tamura, Yosuke et al. "EFR: A Retransmit Scheme for TCP in Wireless LAN s" Proceedings Annual Conference On Local Computer Networks, Oct. 11, 1998, XP002115028, (pp. 2-11).
European Search Report completed on Aug. 16, 2001 by examiner M. Leouffre pertaining to EP 01 10 7783.
Stevens, W.R.., "TCP/IP Illustrated, vol. I The Protocols", Addison Wesley, 1994.

* cited by examiner

*Primary Examiner*—Hassan Kizou
*Assistant Examiner*—M. Sajid Adrami
(74) *Attorney, Agent, or Firm*—Michael Cameron, Esq.

(57) ABSTRACT

A method of controlling the flow of an amount of data from a sending peer to a receiving peer of a predetermined communication protocol is described. The method comprises dividing the amount of data into a plurality of data segments, where the data segments are ordered in a sequence. The segments are sent to the receiving peer in the order of said sequence. The receiving peer acknowledges the correct receipt of a data segment and identifies the last correctly received data segment of the sequence that was received in the proper order of the sequence. The sending peer is arranged such that if it receives a threshold number of duplicate acknowledgements, it performs a retransmission. The threshold number that trigger a retransmission is an adaptive parameter and may assume values larger than three.

24 Claims, 6 Drawing Sheets

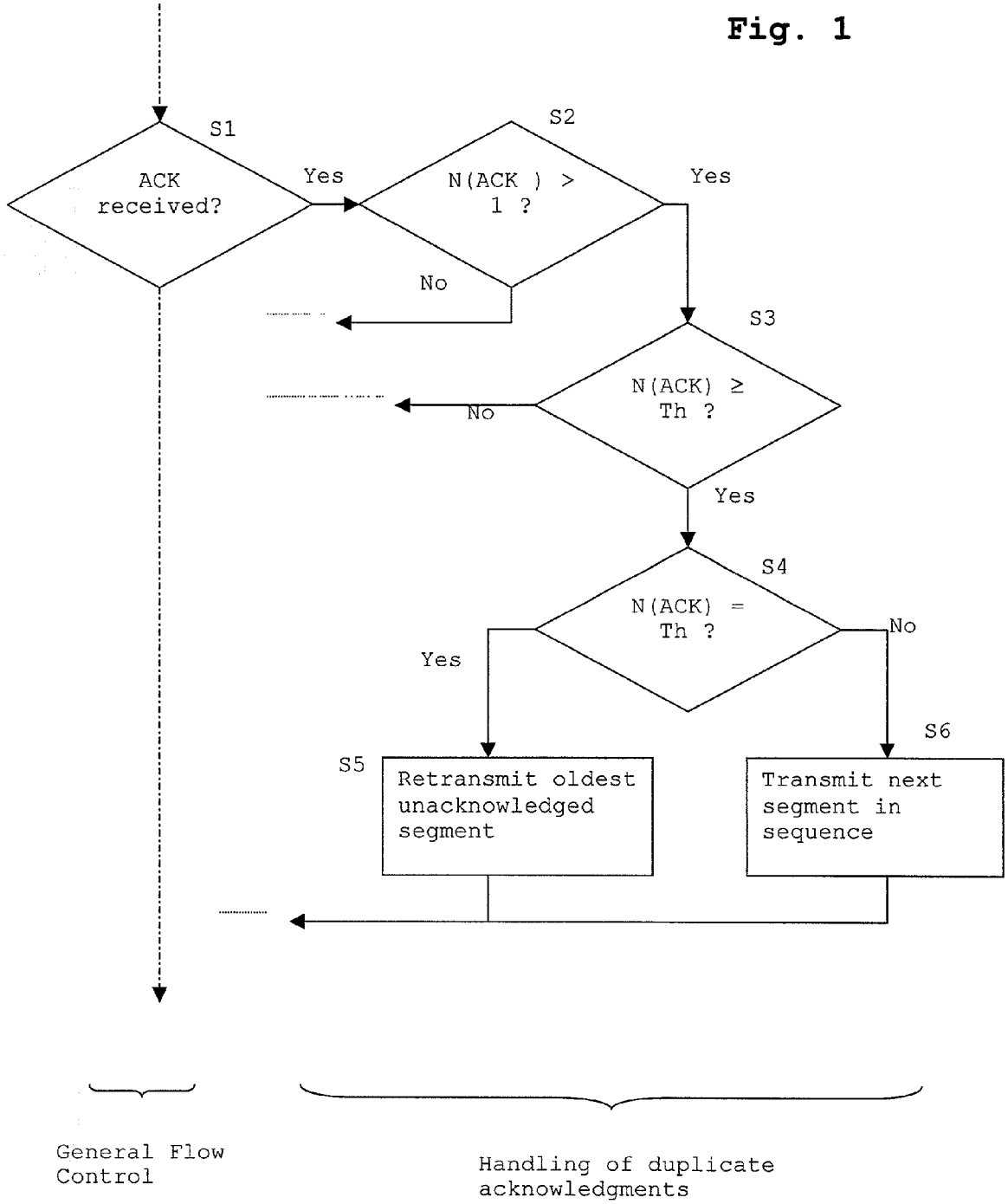

DATA FLOW CONTROL METHOD

FIELD OF THE INVENTION

The present invention relates to a method of controlling the flow of an amount of data from a sending peer to a receiving peer of a given communication protocol.

BACKGROUND OF THE INVENTION

In the field of communications, data transmission techniques are known where an amount of data to be transmitted is divided into a plurality of data segments, the data segments being ordered in a sequence. These data segments are then transmitted in the order of said sequence.

This procedure occurs at a so-called sending peer of a communication governed by a predetermined protocol that contains the rules for handling such data segments. The receiving entity associated with the predetermined protocol is referred to as the receiving peer. The concepts of protocols, protocol hierarchies, layering, and protocol peers is well known in the art, see for example "TCP/IP Illustrated Volume 1, The Protocols" by W. Richard Stevens, Addison Wesley 1994. The well known Transmission Control Protocol (TCP) from the TCP/IP protocols suite is an example of such a protocol that arranges data to be sent into a sequence of segments.

Typically, in order to be sent, the individual segments will be placed into data units having a structure defined by the given protocol. These data units may have different names in the context of different protocols, such as packets, frames, protocol data units, cells, etc. In the present description the term "data unit" shall be used generically to cover any such defined data structure. The present specification shall use the terms "segment" and "data unit" interchangeably.

The sending peer will hand the data unit downwards to a lower layer, e.g. a TCP sending peer will hand a TCP frame down to a link layer, and on the receiving side the receiving peer shall receive data units from the lower layers. The predetermined structure defining the data units, e.g. defining a beginning and an end, allows the receiving peer to identify individual segments.

It may be noted that in accordance with the OSI layering concept, it does not matter how the data units passed to a lower layer are processed and transported there. Namely, the given sending peer passes a stream of bits downward and the receiving peer receives a stream of bits, where this stream of bits contains certain identifying elements, such as frame boundary indicators, with the help of which the receiving peer can identify individual data units and individual segments.

In order to ensure the reliable transmission of data, many protocols provide the feature of data unit retransmission, which means that segments from the sequence can be retransmitted if necessary. Typically this will be done with the help of an acknowledgement technique, which means that the correct receipt of a data unit by the receiving peer is acknowledged with an appropriate acknowledgement message that the receiving peer sends back to the sending peer. Once the sending peer has received such an acknowledgment message, it can appropriately continue sending further data units, or if no acknowledgement or a non-acknowledgement message is received, the data unit that was not correctly received by the receiving peer can be retransmitted by the sending peer.

Several mechanisms are known with the help of which a sending peer is supposed to obtain an indication that the loss of a data unit or segment has occurred, such that an appropriate retransmission can take place. One such known feature is retransmission time-out, which means that after sending a data unit, a timer is monitored, and if a predetermined amount of time passes without having received an acknowledgement for the given data unit, then it is assumed that the data unit has been lost and it is accordingly retransmitted.

Another such mechanism is that of counting duplicate acknowledgements. A duplicate acknowledgement is an acknowledgement that identifies as the last correctly received data segment a data segment that has already been acknowledged previously. Namely, many protocols, such as e.g. TCP, have an acknowledgement generating mechanism for receiving peers that operates to send out an acknowledgement message for each correctly received segment of the sequence, where the acknowledgement identifies the last correctly received data segment in the order of sequence. In other words, if for example the first to fourth data segments have been received and acknowledged, and then the fifth data segment arrives, the receiving peer will send out an acknowledgement for that fifth segment. If thereafter the seventh and eight segments correctly arrive, then the receiving peer will again send out one or two acknowledgement messages, but these acknowledgement messages will only identify the fifth segment, because the fifth was the last segment that was correctly received in the order of the sequence. Namely, the receiving peer is expecting the sixth segment, and even if it correctly receives segments above the sixth segment, it will continue to acknowledge the fifth segment. Consequently, the receipt of duplicate acknowledgements by the sending peer gives the sending peer an indication that a data unit has been lost.

As a consequence, in protocols that use the above described acknowledgement mechanism according to which acknowledgement messages only acknowledge the last data unit that was correctly received in the order of the sequence, even if data units are received that lie further on in said sequence, a retransmission mechanism may be implemented that performs a retransmission if a predetermined number of duplicate acknowledgements is received by the sending peer. In TCP, the corresponding mechanism is known as "fast retransmit", where a retransmission is enacted after the receipt of three duplicate acknowledgements. A detailed description of the fast retransmit mechanism in TCP can e.g. be found in the above mentioned book by Stevens, chapter 21.7.

PROBLEM UNDERLYING THE INVENTION

All such mechanisms as described above for receiving an indication that a data unit has been lost, suffer from the problem that the sending peer only receives an indirect indication that a data unit was lost, and in fact the occurrence of the predetermined triggering event (a time-out or a predetermined number of duplicate acknowledgements) does not necessarily mean that a data unit was really lost. These triggering events can also be caused spuriously, e.g. if a data unit is delayed in the transmission network, while data units associated with segments further on in the sequence are delivered by the network. Such a phenomenon is also referred to as reordering.

In "EFR: A Retransmit Scheme for TCP in Wireless LANs" by Yosuke Tamura, Yoshito Tobe and Hideyuki Tokuda, XP-002115028, a new retransmission scheme is proposed. This paper addresses the problem that occurs when a send window is small, such that when a segment is lost, the receiver will not send the three duplicate acknowledgments needed for triggering a fast retransmit, because the number of segments being sent is too small. In this case a fast retransmission is not possible and the sender will wait until a retransmission time-out occurs. As a solution to this situation, it is proposed that when receiving the first duplicate acknowledgment, the sender calculates the value of the duplicate acknowledgment threshold in dependence on the send window size. The algorithm first converts the value of the send window, which is given in byte, into a value reflecting a number of segments, by dividing the window size by a maximum segment size. Then two is subtracted from the result, in order to determine the duplicate acknowledgment threshold. If the calculated threshold value is larger than three, then the threshold is automatically set to three. Therefore, the value of the duplicate acknowledgment threshold is set to one, two or at most three.

OBJECT OF THE PRESENT INVENTION

It is the object of the present invention to generally improve the possibilities for handling the retransmission of segments in a sending peer.

SUMMARY OF THE INVENTION

This object is solved by a method having the features of claim 1, and by a communication device of claim 22. Advantageous embodiments are described in the independent claims.

In accordance with the present invention, in a system where the receipt of a predetermined number of duplicate acknowledgement messages triggers the retransmission of a data segment that follows the data segment identified in the duplicate acknowledgement, it is proposed to arrange that this predetermined number is an adaptive parameter that may assume values larger than three. This means that the duplicate acknowledgment threshold is a parameter that is adaptable to the general conditions surrounding the sending of data segments, e.g. the conditions of the sending peer, the transmission conditions (as for example determined by the link over which the segments are being sent, or generally by the transmission network over which the segments are being sent), or the conditions of the receiving peer.

It may be noted that the present invention can be implemented in connection with any type of flow control, as long as the communication protocol with which the segments are being sent provides the above described acknowledgement mechanism according to which an acknowledgement message indicates the correct receipt of a data segment and identifies the last correctly received data segment of the sequence that was received in the proper order of the sequence, and the mechanism that a segment is retransmitted if a threshold number of acknowledgement messages identifying the same data segment are received by the sending peer.

Making the duplicate acknowledgement threshold adaptive and able to assume values larger than three greatly increases the flexibility and controllability of a sending peer sending segments. Namely, the duplicate acknowledgement threshold gives an indication of how long the sending peer will consider duplicate acknowledgement messages as only being due to data unit reordering, and when the sending peer assumes that a data unit has been lost. Namely, up to the duplicate acknowledgement threshold, no retransmission occurs, such that it is assumed that the first duplicate acknowledgement messages are due to reordering, whereas when the duplicate acknowledgement threshold is reached, it is assumed that a data unit loss has occurred.

Therefore, the duplicate acknowledgement threshold is a parameter that is associated with the sending peer's decision on how long to wait until a given segment for which duplicate acknowledgements are being received is assumed to have been lost. Due to the solution to the present invention, according to which the threshold is adaptive and may assume values larger than three, it is possible to make this decision itself adaptive and thereby more flexible, even if a large number of segments is being sent.

In this way, the method of the present invention is better suited to handle segment reordering, even if a large number of segments can be sent simultaneously. Due to this fact, the present invention is advantageously applied to a protocol implementation that runs over a lower layer allowing an out of order delivery of data units upwards to said protocol implementation, because then reordering is likely to occur.

The adaptation of the threshold number to the general conditions can be done in any suitable or desirable way. For example, characteristics of the connection between the sending peer and receiving peer can be measured, and the threshold number can be adapted to such measured characteristics. Preferably such measurements are performed by the sending peer. The determination can be done with respect to one or more of any desirable, measurable characteristics of the connection, such as an amount of disturbance (e.g. in terms of error rate), average transmission time, delay, etc. As an example, it is possible to adapt the duplicate acknowledgement threshold to the transmission error rate in such a way that if the error rate increases, the duplicate acknowledgement threshold is lowered and vice versa. More specifically, starting from a predetermined initial threshold value determined for an initial error rate value, an increase of the error rate equal to a predetermined increment can lead to a corresponding lowering of the threshold by a predetermined increment. Naturally, the specific values will depend on the individual application and requirements.

According to a preferred embodiment, the duplicate acknowledgement threshold is adapted on the basis of a variable number of data segments belonging to a predetermined group related to the flow control.

According to one preferred embodiment, the duplicate acknowledgement threshold is adapted on the basis of the number of outstanding data units. Outstanding data units are such data units that were sent by the sending peer, but which have not been acknowledged as the last correctly received data unit (data segment) of the sequence being sent. Adapting the duplicate acknowledgement threshold on the basis of the number of outstanding data units is advantageous, as the number of outstanding data units is an indication of how far reordering can go, e.g. due to lower layer effects.

In accordance with another preferred embodiment, for such systems that employ window-based flow control, the duplicate acknowledgement threshold can also be adapted on the basis of one or more control windows. In systems that use a type of congestion window (as e.g. known from TCP), it is preferable to derive the duplicate acknowledgement threshold on the basis of the congestion window, e.g. as a predetermined fraction thereof. The congestion window is also an indicator for the number of outstanding data units. It may be noted that it is, however, also possible to directly adapt the duplicate acknowledgement threshold on the basis of the number of outstanding data units, even in a system using window-based flow control.

Moreover, it may be also be noted that the duplicate acknowledgement threshold can be adapted on the basis of one or more parameters, such that any of the above mentioned types and examples of parameters can be used individually or in any arbitrary combination for adapting the duplicate acknowledgement threshold.

The adaptation or updating of the duplicate acknowledgement threshold can be done in any suitable or desirable way, and will also depend on which parameter or parameters are used as a basis for the adaptation. For example, it is possible to update the duplicate acknowledgement threshold at regular intervals. In other words, the parameter or parameters used as a basis for adapting the duplicate acknowledgement threshold are regularly measured, and the threshold is regularly updated on the basis of these measurements. On the other hand, it is also possible that the updating of the duplicate acknowledgement threshold only takes place at the occurrence of a predetermined triggering event. The triggering event can be selected as is suitable or desirable, and can e.g. be the first receipt of a duplicate acknowledgement, every receipt of a duplicate acknowledgement, or also whenever the relevant parameter (or parameters) on the basis of which the duplicate acknowledgement threshold is adapted, changes.

As another possibility, the duplicate acknowledgement threshold can also be updated at the receipt of every acknowledgement (i.e. not only at the receipt of a duplicate acknowledgement), or at every acknowledgement that relates to an outstanding data unit or segment.

BRIEF DESCRIPTION OF FIGURES

Further aspects and advantages of the present invention shall become more readily apparent from the study of the detailed embodiments of the invention, which shall be described in the following with reference to the enclosed figures, in which:

FIG. 1 shows a flow chart of an embodiment of the present invention;

DETAILED DESCRIPTION OF PREFERRED EMBODIMENTS

Figure 2A:
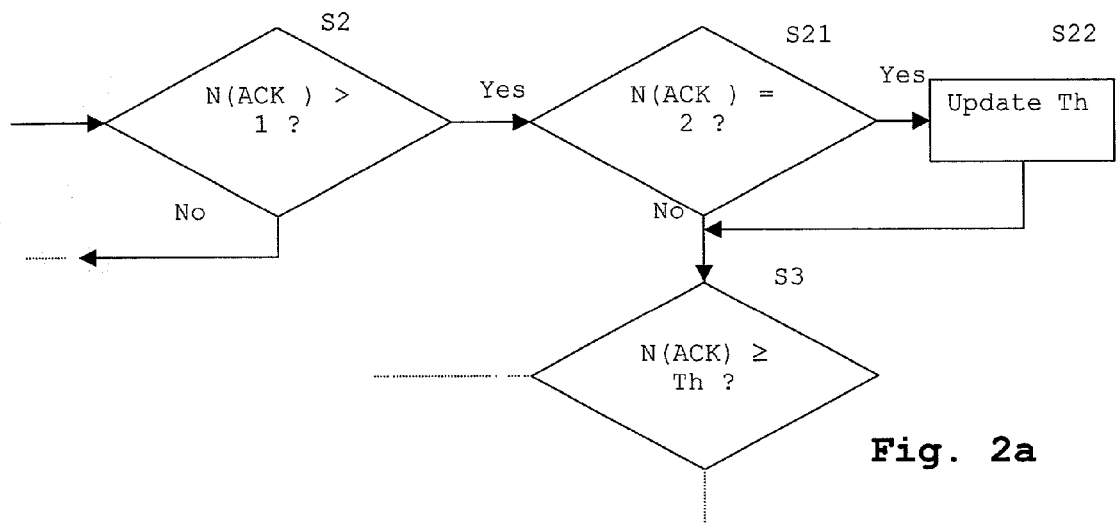
FIG. 2a shows a flow chart relating to a possible updating procedure for the duplicate acknowledgement threshold.

The present invention is applicable to any implementation of a given communication protocol to which an amount of data that is to be sent is divided into a plurality of data segments, and said data segments are ordered in a sequence, where the data segments are sent from the sending peer to the receiving peer in the order of said sequence, where a receiving peer sends acknowledgements to the sending peer, said acknowledgements indicating the correct receipt in the proper order of the sequence, such that an acknowledgement message indicates the last correctly received data segment of said sequence that was received in the proper order of the sequence, and where if the sending peer receives a threshold number of acknowledgement messages that each identify the same data segment as the last correctly received data segment of the segment that was received in the proper order, the segment that immediately follows the segment for which duplicate acknowledgements were received is retransmitted.

An example of such a protocol is TCP. However, it is noted that the invention is also applicable to any other communication protocol that has the above described characteristics.

According to the present invention, the threshold number of acknowledgement messages, i.e. the duplicate acknowledgement threshold is an adaptive parameter that may assume values larger than three.

As already mentioned previously, therefore, the duplicate acknowledgement threshold is a parameter that is associated with the sending peer's decision on how long to wait until a given segment for which duplicate acknowledgements are being received is assumed to have been lost. Due to the solution to the present invention, according to which the threshold is adapted, it is possible to make this decision itself adaptive and thereby more flexible.

FIG. 1 shows a flow chart that describes an embodiment of the present invention. The left hand side of the flow chart relates to general flow control, and due to the fact that the present invention is not concerned with the general type of flow control, this part is only shown schematically as a dashed line. The right hand side of the Fig. discloses a procedure for handling duplicate acknowledgements. Namely, if in the course of the general flow control an acknowledgement (ACK) is received, see step S1 then the procedure for handling duplicate acknowledgements is triggered.

In step S2 it is determined if the acknowledgement is a duplicate acknowledgement. Namely, the number of times N that the specific acknowledgement, which identifies the last correctly received data segment of the sequence that was received in the proper order of the sequence, is determined and it is judged if this number N is larger than 1. If not, then the ACK is not a duplicate ACK, and the procedure returns to the general flow control.

If the outcome of step S2 indicates that the acknowledgement is a duplicate acknowledgement, the procedure goes to step S3, where it is determined if N(ACK) is larger than the duplicate acknowledgement threshold Th.

This step can be implemented in any appropriate way, for example by simply keeping a record of the last acknowledged segment and setting an associated counter, such that if a newly received acknowledgment is identical to the previous acknowledgement (i.e. a duplicate acknowledgement) the counter is incremented by one, and if the new acknowledgement identifies a segment that is subsequent to the segment identified in the last received acknowledgement, then the counter is reset to 1.

In the example of FIG. 1, N(ACK) indicates the number of times that the sending peer has received the given acknowledgement ACK. In other words, N=1 means that the acknowledgement for a given segment has been received the first time, and a number N>1 indicates that it is a duplicate acknowledgement.

If step S3 determines that the number of acknowledgments has not yet reached the threshold, the procedure goes back to the general flow control. However, if the threshold has been reached or exceeded, the procedure goes to step S4, where it is determined if the number of received duplicate acknowledgments is equal to the presently set duplicate acknowledgment threshold Th. If it is, then the oldest unacknowledged segment is retransmitted in step S5. The oldest unacknowledged segment then immediately follows the segment identified in the duplicate acknowledgments. On the other hand, if the outcome of step S4 is negative, which means that N(ACK)>Th, then the next segment in the sequence following the segment that immediately follows the segment identified in the duplicate acknowledgment, is transmitted.

After steps S5 or S6, the procedure again returns to the general flow control.

It may be noted that the embodiment of FIG. 1 is only one example, and this example can be varied in a number of ways. The skilled person will understand that the steps can also be arranged differently. Moreover, step S6 is only an example, as the present invention is not specifically concerned with the procedure after the duplicate acknowledgment threshold is exceeded. In other words, the procedure after exceeding the duplicate acknowledgment threshold can be chosen in any appropriate or suitable way, where different possibilities for TCP-like protocols shall be discussed further on.

Equally, the response in the general flow control to duplicate acknowledgments is not essential to the present invention. For example, after the negative outcome of step S3, which means that a duplicate acknowledgment has been received, but the number of duplicate acknowledgments has not yet reached the threshold, the general flow control can stop sending any further segments, or can equally well continue to send further segments.

The duplicate acknowledgment threshold can be updated in any suitable or desirable way. For example, it can be updated at regular intervals, based on one or more values used for adapting the threshold. In other words, these one or more values are regularly measured or determined, and the threshold Th is accordingly updated. This process occurs outside of what is shown in FIG. 1, in an independent procedure. Consequently, this independent procedure regularly updates the value of Th that is appropriately stored, and steps S3 and S4 simply access or call the current value of Th. On the other hand, it is also possible to update Th at the occurrence of a predetermined triggering event. One possibility can consist in updating Th only if one or more of the one or more values used to adapt Th has changed. Such a procedure would again be independent of what is shown in FIG. 1, and steps S3 and S4 would simply access or call the current value of Th.

However, the specified triggering event can also be a part of the procedure shown in FIG. 1. Namely, it is possible to perform and updating of Th at the occurrence of a triggering event that is associated with the receipt of acknowledgments. For example, Th can be updated at every first receipt of a duplicate ACK. This is shown in FIG. 2a, where the same reference numerals as used in FIG. 1 refer to the same steps. In other words, the steps S21 and S22 shown in FIG. 2a are implemented between the steps S2 and S3 as shown in FIG. 1. After step S2 has determined that a duplicate acknowledgment has been received, step S21 determines if the duplicate acknowledgment is the first duplicate acknowledgment, namely if N(ACK)=2, and if this is the case, then Th is updated in step S22. After steps S21 or S22, step S3 is performed, and all the other steps already discussed in connection with FIG. 1, such that a further discussion is not necessary.

Figure 2B:
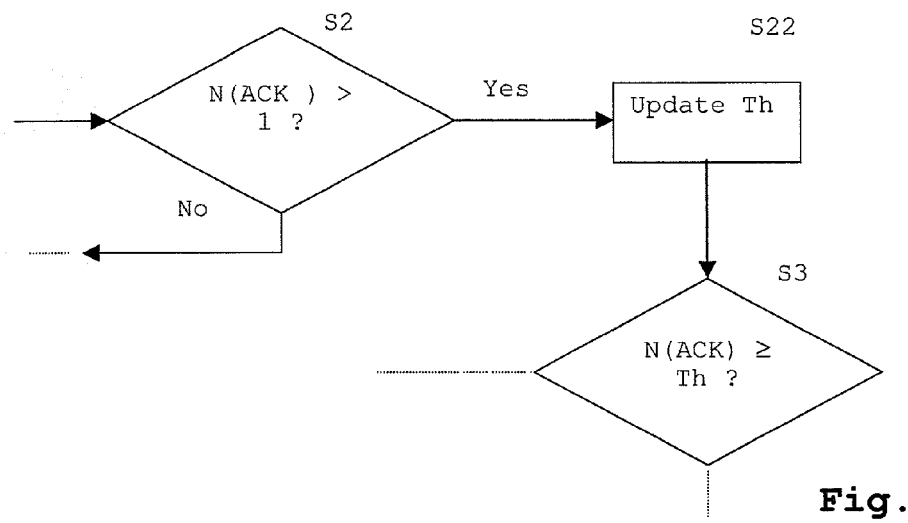
FIG. 2b shows a flow chart of another possibility of an updating procedure for the duplicate acknowledgement threshold.

It is also possible to perform an updating of Th at every duplicate acknowledgment. This is shown in FIG. 2b. Namely, the updating step S22 follows after step S2, such that every duplicate acknowledgment leads to an updating of Th.

As another alternative, which is not shown in the figures, the threshold Th can also be updated at every acknowledgment. In other words, the updating step S22 would be implemented between steps S1 and S2 of FIG. 1. Another variation can consist in updating the threshold Th at every ACK that relates to outstanding data segments, i.e. only for such acknowledgments where N(ACK)=1. Consequently, the updating step could be implemented at the negative output of step S2 in FIG. 1.

As described above, the updating of the duplicate acknowledgment threshold Th can be done whenever suitable or desirable. Equally, it can be done on any appropriate or suitable basis. It is preferable that the current value of the duplicate acknowledgment threshold be determined on the basis of measurements made with respect to the characteristics of the connection between the sending peer and the receiving peer. Although such measurements can be performed at any point, i.e. at the sending peer and/or in the network between the sending peer and receiving peer and/or at the receiving peer, they are preferably performed at the sending peer.

Although the value of the duplicate acknowledgment threshold can be adapted on the basis of any suitable variable characteristic or parameter, it is preferably adapted on the basis of a variable parameter associated with the flow control of data segments being sent. Such a parameter associated with the flow control of data segments being sent can be the number of data segments in a predetermined category or group, e.g. the number of data units in a given transmission window in the case of a system using window-based flow control, or can also be the number of outstanding data units. An outstanding data unit is a data unit or segment that was sent by the sending peer, but for which the sending peer has not yet received an acknowledgment message identifying said data unit or segment as the last correctly received segment of the sequence that was received in the proper order of the sequence.

If the duplicate acknowledgment threshold is determined on the basis of a number of segments, be it the number of outstanding segments or the number of segments in a predetermined group, such as a transmission window, then the duplicate acknowledgment threshold is preferably determined as a predetermined fraction of said number of data units. For example, this fraction can be one half. In other words, the number of segments in the group is divided by a predetermined factor, e.g. 2.

This is quite distinct from the algorithm proposed by Tamura et al., where the threshold is determined by subtracting a constant from the number of segments in the send window.

If the protocol to which the present invention is applied is the transmission control protocol (TCP), then the duplicate acknowledgment threshold can be determined as a predetermined fraction of the congestion window, for example one half. Any fraction between one third and two thirds is suitable. It may be noted that such an embodiment of the invention using a predetermined fraction of a transmission window, and more specifically of a congestion associated window, is not restricted to TCP, as such an application is possible in the context of any protocol that is window-based and uses a congestion associated transmission window. More specifically, a congestion associated transmission window is a window that the sending peer initialises to a predetermined initial size, and then controls the size in dependence on acknowledgment messages received from the receiving peer, and on the occurrence of congestion indicating events, such as duplicate acknowledgments, retransmission time-outs, non-acknowledgment messages, direct congestion indication messages from the network, etc. Namely, upon receiving acknowledgments, the size of the congestion window will be increased, and upon the occurrence of congestion indicating events, the size of the congestion window will be reduced.

For the above embodiments in which the duplicate acknowledgment threshold, which is an integer value, is determined on the basis of a window size, or more generally on the basis of a number of data units belonging to a predetermined category, the calculation of the duplicate acknowledgment threshold will depend on the mechanism according to which the specific protocol or protocol implementation keeps track of data segments and how such windows or groups are represented. Namely, if the protocol is segment oriented, which means that the segments have consecutive numbers and are identified by these consecutive numbers, such that a window can also directly be determined as a number of such segments, then the calculation of a fraction simply consists in dividing the given number by a predetermined denominator or factor, e.g. 2 if the above-mentioned predetermined fraction is one half. However, many protocols, such as TCP, are byte oriented, which means that the segments are not directly numbered, but much rather are only referred to by a byte count. More specifically, if the amount of data to be sent consists of K bytes, then each segment will be identified by a byte count $k_i$, where $k_i < K$ and $k_i < k_{i+1}$. For example, if the amount of data to be sent consists of 10240 bytes, then this amount may be divided into 10 segments, each segment having 1024 bytes. The first segment is then described by 1024, the second by 2048, the third by 3072, etc. As a consequence, the acknowledgment messages then identify segments by communicating such a byte count. Moreover, in a byte oriented protocol that uses window-based flow control, the window sizes are also represented in bytes. As such byte oriented protocols are well-known in the art, no further explanation is necessary here.

For such byte oriented protocols, the determination of the duplicate acknowledgment threshold, which is an integer value, can be done by dividing the relevant byte value on the basis of which the threshold is being adapted (e.g. a transmission window size or a number of data units, such as the number of outstanding data units) by a predetermined denominator or factor (such as 2 if the predetermined fraction is one half), and by an appropriate segment translation size for translating a byte value into a number of segments. Typically this segment translation size will be a maximum segment size (e.g. the maximum value, in bytes, that a segment may assume). The maximum segment size can either be specifically defined for the described process, e.g. is initially set together with an initial duplicate acknowledgment threshold, or if the protocol to which the present invention is being applied already has such a maximum segment size as a parameter, as in the case of TCP, then this available parameter can directly be used.

It may be noted that in both of the above cases, i.e. either directly dividing a integer number of segments, or dividing a number of bytes and using a segment translation parameter, it is possible that the result is not an integer value. In this case, the duplicate acknowledgment threshold can be determined by a suitable rounding operation either to the next highest or next lowest integer.

Figure 4A:
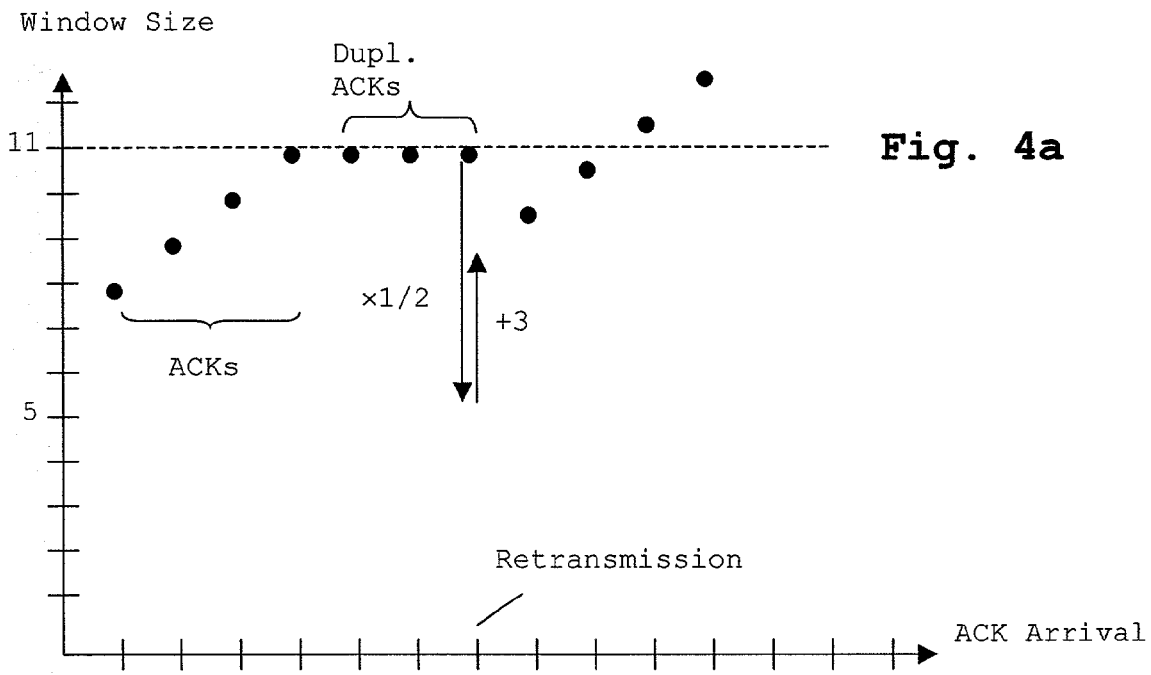
FIG. 4a shows the relationship between transmission window size and ACK arrival time in a system using window-based flow control and operating in accordance with the prior art.
Figure 4B:
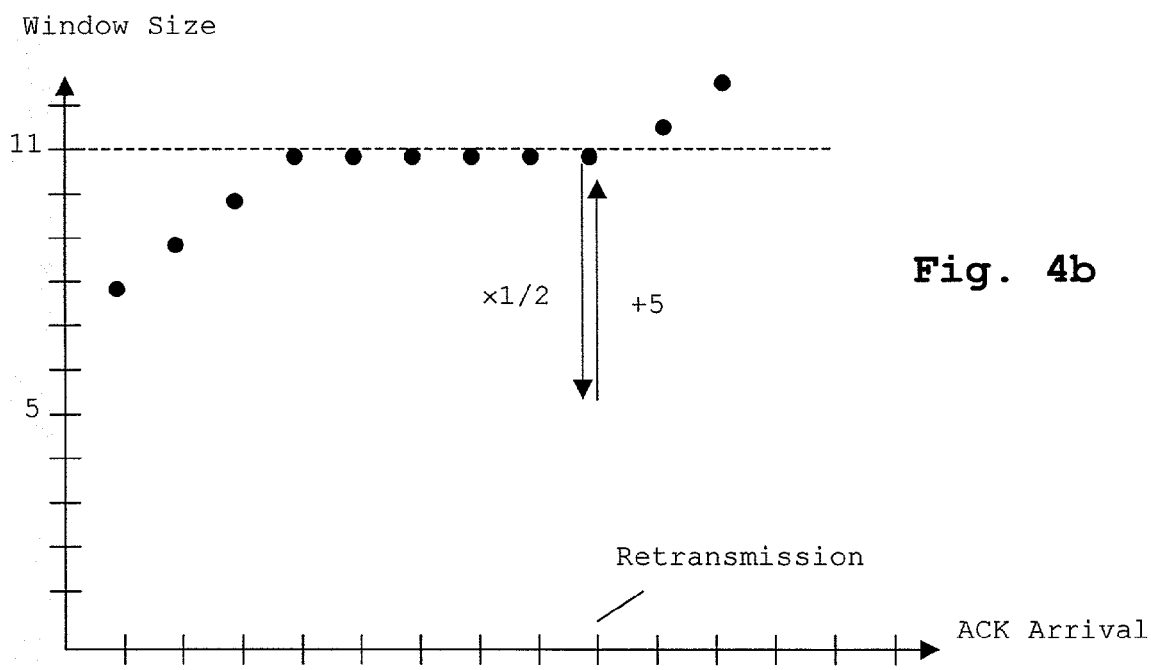
FIG. 4b shows the relationship between transmission window size and ACK arrival time in a system using window-based flow control and operating in accordance with an example of the present invention.
Figure 4C:
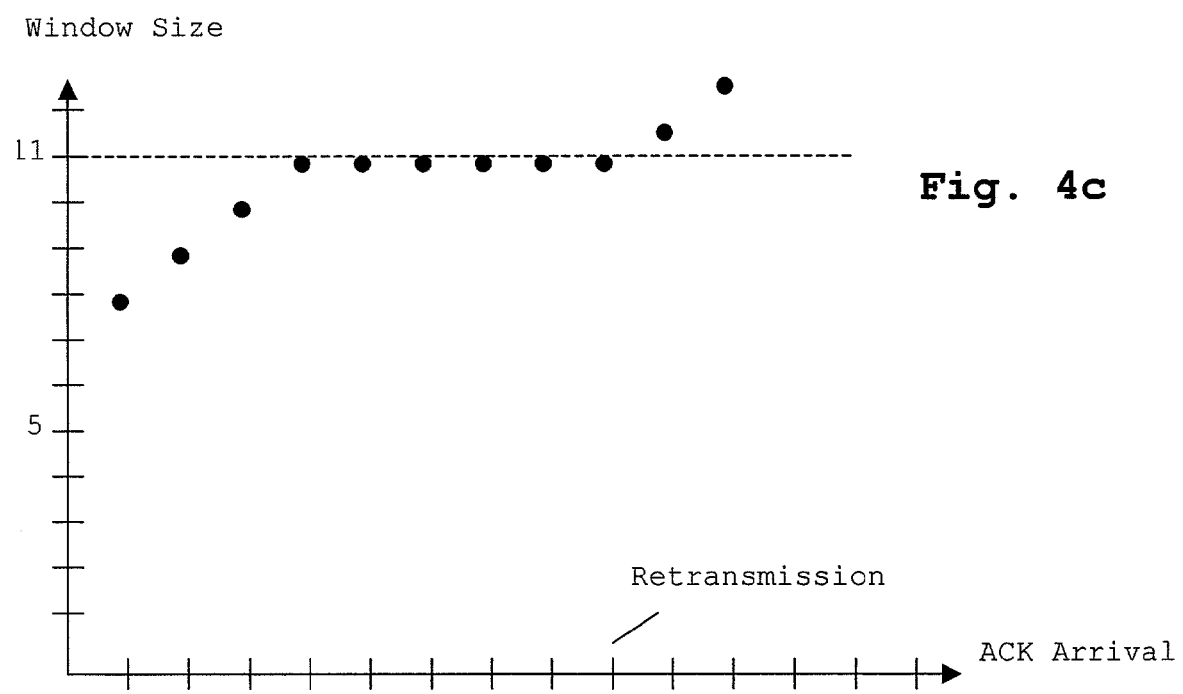
FIG. 4c shows the relationship between transmission window size and ACK arrival time in a system using window-based flow control and operating in accordance with another example of the present invention.

The graphs in FIGS. 4a–4c show the window size with respect to acknowledgment arrivals, where the black dots mark the arrival of an acknowledgment. The ordinate is represented in terms of multiples of the maximum segment size.

Now an example of the application of the present invention to a protocol implementation that operates like TCP will be described. FIG. 4a shows the operation of the conventional management of duplicate acknowledgments as specified in TCP, with respect to the adjustment of window size. More specifically, as e.g. described in Chapter 21.7 of the above-mentioned book by Stevens, TCP is arranged to perform a retransmission after having received the third duplicate acknowledgment, and after the retransmission the congestion window cwnd is set to the so-called slow start threshold size ssthresh, which in FIG. 4a is determined as one half of the window size at the time of receiving the third duplicate acknowledgment, and then adding three times the segment size to the result. Then the congestion window cnwd is linearly increased in response to the arrival of further acknowledgments. As a consequence, one can see that if the window size at the time of receiving the third duplicate acknowledgment is very large, then the reduction of the window by one half and only adding 3 segment sizes to the resulting window will lead to a great reduction in window size. Consequently, it will take some time before the window reaches the size it had before the retransmission.

FIG. 4b shows an example where the present invention is applied. Namely, the duplicate acknowledgment threshold is not fixed to the value of 3 as in the case of conventional TCP (see FIG. 4a), and also not restricted to a maximum of 3, as in the above discussed article by Tamura et al., but is determined on the basis of the current congestion window, which in the example of FIG. 4b is eleven times the maximum segment size. More specifically, it is determined as one half of this congestion window size, rounded down in the event of a non-integer result. As 11 is the window size, the result of taking one half leads to a non-integer result of 5.5, such that the duplicate acknowledgment threshold is set to 5. As can be seen, this result exceeds 3. Consequently, after having received the fifth duplicate acknowledgment, a retransmission is conducted. In accordance with the example of FIG. 4b, the congestion window is then reduced as in the conventional case, namely to ssthresh, i.e. one half of the congestion window at the time of retransmission. However, then the value of the duplicate acknowledgment threshold is added to the result, i.e. 5 in the example of FIG. 4b. If the congestion window size at the time of retransmission is an even value, then this procedure would mean that the congestion window will remain at the same size. As the congestion window has a size that corresponds to an uneven multiple of the maximum segment size in the shown example, the congestion window size returns to a value slightly smaller than the value prior to retransmission, namely 10.5 in the example of FIG. 4b.

Preferably, the control of the congestion window size is decoupled from the retransmission procedure, such that the process proceeds as shown in FIG. 4c. Namely, after receiving the threshold number of duplicate acknowledgments (in the example of FIG. 4c the value of Th is equal to 5, like in FIG. 4b), the congestion window size remains unchanged, and after receiving further acknowledgments, the congestion window size is linearly increased, e.g. in accordance with the congestion avoidance algorithm that is well-known from TCP.

The advantages of the embodiments shown in FIGS. 4b and 4c with respect to the situation shown in FIG. 4a and also with respect to the prior art of Tamura et al. become more pronounced if the congestion window is capable of reaching sizes that are much larger than 3. This can be expected if the transmission network over which data units are being sent has a large capacity, as e.g. a system operating in accordance with the universal mobile telephone system (UMTS) standard. Consequently, the present invention is preferably applied in the context of protocols that operate over link layer protocols which provide such high data rate links. In other words, it is preferable to apply the method of the present invention to a transport layer, referred to as L4 in the OSI standard, when the link layer L2 over which the L4 layer is implemented, is a layer associated with a high bandwidth transmission network, such as the UMTS network. As the method of the present invention is capable of dealing with reordering, the present invention is especially advantageous if the lower protocol layers below L4 are implemented in such a way that they can release L4 data units out of order, in which case reordering is likely to occur.

Figure 3A:
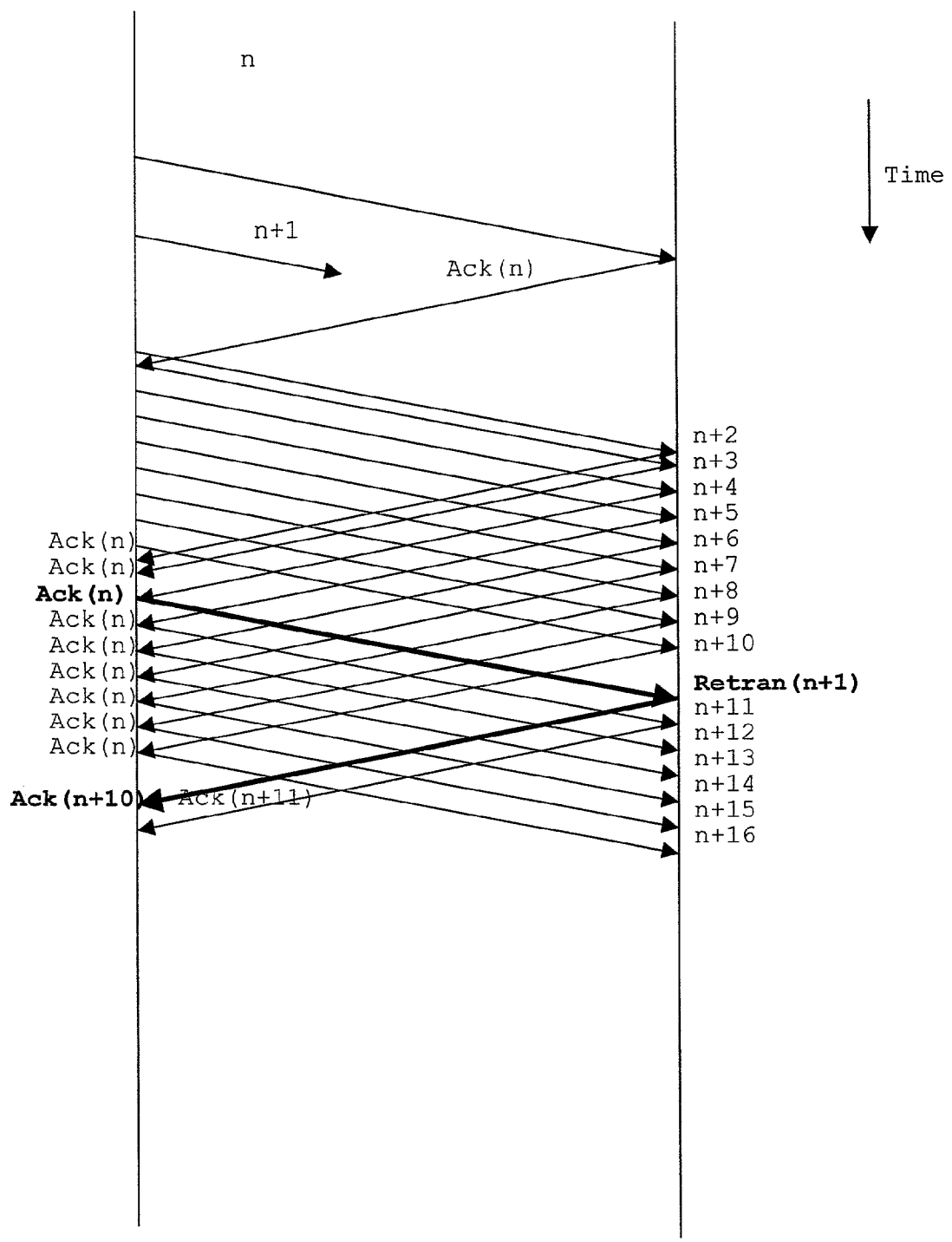
FIG. 3a shows an exchange of data units and acknowledgement messages between a sending peer and receiving peer operating in accordance with the prior art.
Figure 3B:
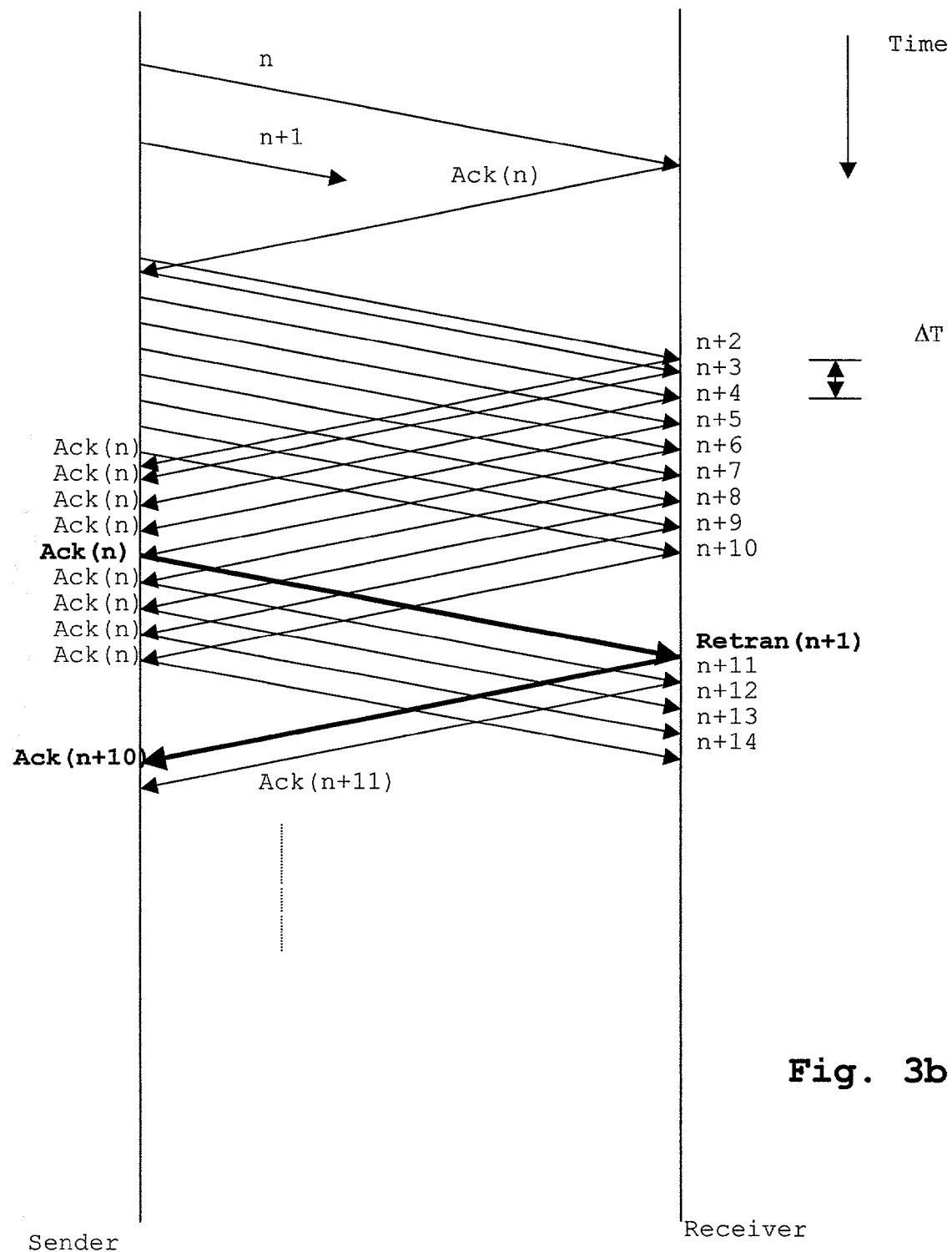
FIG. 3b shows an example of a sending peer and receiving peer exchanging data units and acknowledgments in accordance with an embodiment of the present invention.

Now an example of an exchange of segments and corresponding acknowledgments between a sending peer and receiving peer, both for the prior art and when applying the present invention, shall be described by referring to FIGS. 3a and 3b. More specifically, FIG. 3a shows the case where a sender sends segments that are referred to by the integer variable n to a receiver. In the example of FIG. 3a, a segment n is sent and acknowledged, whereas a segment n+1 is lost in the transmission. As a consequence, the receiver only acknowledges segment n as the last correctly received data segment of the sequence that was received in the proper order of the sequence, although the receiver has correctly received segments n+2, n+3, etc. As already mentioned, FIG. 3a shows the standard TCP prior art situation, where a retransmission is conducted after the receipt of the third duplicate acknowledgment. The retransmission of segment n+1 is shown by a bold arrow. After having correctly received the retransmitted segment n+1, the receiver acknowledges segment n+11 as the last correctly received data segment of the sequence that was received in the proper order of the sequence.

FIG. 3b shows the same initial situation as FIG. 3a, but the present invention is applied and the duplicate acknowledgment threshold is determined on the basis of the congestion window size, namely as one half of this congestion window size (determined in multiples of the maximum segment size). The duplicate acknowledgment threshold is therefore not restricted to a specific value (as in the standard TCP case), and also not to a specific maximum value (as in the case of the Tamura article). In the example FIG. 3b, the congestion window size is presumed to be 10 or 11, such that the duplicate acknowledgment threshold is 5. As a result, the sender waits a period of time ΔT longer until retransmitting segment n+1, if the situation is as shown in FIG. 3b, namely that a fifth duplicate acknowledgment arrives at the sender's side. On the other hand, if the segment n+1 is in fact not lost, but only delayed, and it would arrive during the time ΔT indicated in FIG. 3b, then the correct receipt of segment n+1 would be acknowledged before a retransmission takes place on the sender's side, as the threshold number of duplicate acknowledgment will not be reached in that case.

The method of the present invention can be put to practice in any suitable or appropriate way, and can especially be present in the form of a computer program, and consequently also in the form of a storage medium carrying such a computer program. Equally, the invention can be present in the form of a communication device arranged to operate in accordance with the method of the invention.

Although the present invention has been described by way of detailed embodiments, the invention is by no means restricted to these embodiments, as it is defined by the appended claims. Also, reference numerals in the claims are not to be understood as restrictive, as they only serve to make the claims easier to read.

What is claimed is:

1. A method of controlling the flow of an amount of data from a sending peer to a receiving peer of a predetermined communication protocol, comprising:
dividing said amount of data into a plurality of data segments, said data segments being ordered in a sequence,
transmitting said data segments from said sending peer to said receiving peer in the order of said sequence,
determining at said receiving peer if a data segment was received correctly, and if a correctly received data segment is in the proper order of said sequence,
sending acknowledgment messages from said receiving peer to said sending peer, where an acknowledgment message indicates the correct receipt of a data segment and identifies the last correctly received data segment of said sequence that was received in the proper order of said sequence, and
if the sending peer receives a threshold number of duplicate acknowledgement messages that each identify the same one data segment as the last correctly received data segment of said sequence that was received in the proper order of said sequence, retransmitting the segment that immediately follows said one data segment, where said method comprises a threshold number adaptation procedure performed by the sending peer for dynamically adapting said threshold number, where the current value of the duplicate acknowledgement threshold is determined on the basis of measurements made with respect to the characteristics of the connection between the sending peer and the receiving peer and where said threshold number adaptation procedure is arranged such that said threshold number may assume values larger than three.

2. The method of claim 1, wherein said threshold number adaptation procedure comprises: performing a data segment number determination procedure, said data segment number being an integer that identifies a number of data segments belonging to a predetermined group associated with flow control, dividing said number of data segments by a predetermined factor, and adapting said threshold number on the basis of the result of dividing said number of data segments by the predetermined factor.

3. The method of claim 2, wherein said predetermined factor is an integer.

4. The method of claim 3, wherein said predetermined factor is two.

5. The method of claim 2, wherein said step of adapting said threshold number on the basis of the result of dividing said number of data segments by the predetermined factor comprises setting said threshold number equal to said result if said result is an integer, and otherwise performing a predetermined rounding operation on said result and then setting the threshold number equal to the result of said rounding operation.

6. The method of claim 2, wherein the controlling of the flow of data segments involves a sliding window technique using one or more windows, and said predetermined group is associated with a given one of said one or more windows.

7. The method of claim 6, wherein said predetermined group is associated with a window that is calculated by said sending peer.

8. The method of claim 6, wherein said given window is a congestion window, a congestion window being associated with a flow control sub-procedure according to which at the beginning of sending said plurality of data segments, said sending peer initializes the size of said congestion window to a predetermined initial value and then controls the size in dependence on said acknowledgement messages and on the occurrence of congestion indicating events.

9. The method of claim 8, wherein said predetermined communication protocol is the Transmission Control Protocol, and said congestion window is the TOP congestion window.

10. The method of claim 6, wherein said data segment number determination procedure comprises dividing the size of said given window by a data segment size indicator.

11. The method of claim 10, wherein said data segment size indicator is the maximum segment size.

12. The method of claim 2, wherein said predetermined group is the set of outstanding data segments, such that said data segment number is equal to the number of outstanding data segments, an outstanding data segment being a data segment that was sent by said sending peer, but for which said sending peer did not receive an acknowledgement message identifying said data segment as the last correctly received data segment of said sequence that was received in the proper order of said sequence.

13. The method of claim 2, wherein said threshold number is adapted each time that the predetermined group changes.

14. The method of claim 1, wherein said threshold number is updated at least each first time that a duplicate acknowledgement message for one of said data segments is received.

15. The method of claim 14, wherein said threshold number is updated each time that a duplicate acknowledgement message is received.

16. The method of claim 1, wherein said threshold number is updated each time that an acknowledgement message is received.

17. The method of claim 1, wherein said threshold number is updated each time that an acknowledgement message is received that identifies an outstanding data segment, an outstanding segment being a segment that was sent by said sending peer, but for which said sending peer did not receive an acknowledgement message identifying said segment as the last correctly received data segment of said sequence that was received in the proper order of said sequence.

18. The method of claim 1, wherein said predetermined communication protocol lies at a first protocol layer, and a second protocol layer comprising a predetermined protocol implementation is provided below said first protocol layer for receiving said data segments from the sending peer of said predetermined communication protocol and releasing said data segments to the receiving peer of said predetermined communication protocol, where said predetermined protocol implementation is operable to release said data segments out of order of said sequence.

19. The method of claim 18, wherein said first protocol layer is a transport layer, and said second protocol layer is a link layer.

20. A computer program arranged to perform the method of claim 1 when executed on a computer.

21. A computer readable memory device that stores the computer program of claim 20.

22. A communication device arranged to send and receive data, said communication device being arranged to operate as a sending and/or receiving peer in accordance with the method of claim 1.

23. The method of claim 1 wherein the characteristics of the connection between the sending peer and the receiving peer are characteristics comprised from the group consisting of: an amount of disturbance of the connection, average transmission time for transmitting the data segment, and average transmission delay for transmitting the data segment.

24. The method of claim 1 wherein the duplicate acknowledgment threshold is adapted on the basis of the number of outstanding data segments sent from the sending peer to the receiving peer.

* * * * *